Patented July 3, 1951

2,559,529

UNITED STATES PATENT OFFICE 2,559,529

PROCESS FOR REMOVING SULFATE AND BICARBONATE IONS FROM WATER

William C. Bauman, Midland, Mich., assignor to The Dow Chemical Company, Midland, Mich., a corporation of Delaware No Drawing. Application December 29, 1948, Serial No. 68,031

6 Claims. (Cl. 210—24)

This invention concerns a method of displacing, with chloride ions, dissolved sulfate and bicarbonate ions from water while the latter is in a neutral to alkaline condition. It pertains especially to such removal of sulfate and bicarbonate ions from water which is to be used in boilers or hot water systems.

For use in steam rollers, or hot water systems, etc., it is important that water be neutral or somewhat alkaline so as to avoid corrosion of the iron or steel equipment, and that it be as free as possible of sulfates and bicarbonates since alkaline earth metal sulfates and bicarbonates, in particular, tend to incrust and cause embrittlement of boiler plates and tubes or other metal parts. It is known to demineralize water by passing the same through a bed of an acid form of a cation exchange agent (whereby metal cations are absorbed by the agent and the water is rendered acidic) and then through a bed of a basic anion exchange agent containing amino groups to absorb the acidic anions and bring the water to a condition approaching neutrality. Heretofore both of these steps have been necessary for removal of the sulfate and bicarbonate ions from water, inasmuch as the anion exchange agents which have been employed are ineffectual in absorbing and removing anions from water where the latter is in a neutral or alkaline condition.

Although this known demineralization method is highly effective in conditioning water for use in boilers, it is inconvenient and expensive. In many instances it would be sufficient if the sulfate and bicarbonate ions in the water could be replaced with chloride ions so that the alkaline earth metal impurities would remain dissolved during use of the water in a heated system.

It is an object of this invention to provide a method for removing sulfate and bicarbonate ions from neutral and alkaline water directly by use of an anion exchange agent. A further object is to provide a method for removing sulfate and bicarbonate ions from water by replacing the sulfate and bicarbonate ions with chloride ions by use of a chloride of a strongly basic anion exchange resin containing quaternary ammonium chloride groups. Still another object is to remove sulfide and bisulfide ions from neutral and alkaline water by use of such anion exchange resins. Other and related objects will be apparent from the following description of the invention.

According to this invention, water containing undesirable sulfate, bicarbonate, sulfide and bisulfide ions, of alkali metals and alkaline earth metals dissolved therein, is purified and the undesirable anions removed by passing the water into contact wtih a bed of a chloride of a strongly basic anion exchange resin to absorb the undesirable anions.

During contact of the water containing the undesirable anions with the chloride form of a strongly basic anion exchange resin, the sulfate ions, bicarbonate ions, etc., are absorbed by the anion exchange resin and displace from the resin, chloride ions which become dissolved in the water. When the anion exchange resin has absorbed its capacity of sulfate and bicarbonate ions, it may be regenerated, i. e. brought to a form suitable for reemployment in the process, by washing the same with a concentrated aqueous solution of an alkali metal halide, e. g. sodium or postassium chloride.

The invention provides a method of readily and economically removing undesirable sulfate, sulfide, bicarbonate and bisulfide ions from water of neutral to alkaline pH value, by displacement of the undesirable sulfate and bicarbonate ions with chloride ions.

The anion exchange resins to be employed should be strongly basic. Any anion exchange resin which, when added in basic, i. e. hydroxide, form to a 1 normal aqueous sodium chloride solution, brings the latter to a pH value of 10 or above is suitable for use in the process. In general, water-insoluble anion exchange resins which are quaternary ammonium bases are satisfactory. A number of such water-insoluble resinous quaternary ammonium bases are described in an application Serial No. 68,058 of G. D. Jones filed on even date herewith.

In brief, an anion exchange resin, that is a quaternary ammonium base or a salt thereof, may be prepared by reacting a halomethylating agent such as chloromethyl methyl ether or bromomethyl methyl ether, with the normally solid higher polymers and copolymers, i. e. having a molecular weight of 50,000 and above, of monovinyl-aromatic compounds, e. g. styrene, ar-chlorostyrene, ar-methylstyrene, vinylnaphthalene, etc., which copolymers frequently contain 20 per cent by weight and less of a polyvinyl-aromatic compound such as divinylbenzene, ar-divinyltoluene, divinylnaphthalene, ar-divinylxylene, ar-divinylethylbenzene, etc., chemically combined or interpolymerized with the monovinyl-aromatic compound, to obtain a halomethylated vinyl-aromatic resin, having halomethyl radicals attached to aromatic nuclei in the resin. Thereafter the halomethylated vinyl-aromatic resin is reacted with a tertiary amine, e. g. to form a quaternary ammonium halide. The halomethylating reaction may be carried out at room temperature or above in the presence of a halomethylating catalyst, e. g. zinc chloride, zinc oxide, stannic chloride, aluminum chloride, tin, zinc, iron, etc., while the polymer is swollen by or dissolved in an organic liquid, such as an excess of the halomethylating agent, which is less reactive with the halomethylating agent than is the polymer. The quaternizing reaction, i. e. the reaction of the halomethylated vinyl-aromatic resin with the tertiary amine, is usually carried out by dispersing the solid granular halomethylated vinyl-aromatic resin and tertiary amine in a liquid, such as water, ethyl alcohol, or acetone, and maintaining the mixture at temperatures of from 25° to 100° C., over a period of 4 hours or longer. The resinous product is washed with water, or preferably with an organic solvent such as acetone or dioxane, etc., and then water, to remove any soluble components, e. g. unreacted tertiary amine.

The process of the invention may be carried out in any suitable apparatus of the type commonly employed in zeolite water conditioning, e. g. constructed of iron or steel. The water to be treated is passed by gravity or under pressure through one or more beds of the strongly basic anion exchange resin, containing quaternary ammonium chloride groups, to absorb the undesirable ions, e. g. sulfate and bicarbonate ions. The rate of flow of the water through the resin bed is adjusted so that the water flowing from the resin bed is free, or substantially free of the undesirable anions.

When the anion exchange resin becomes depleted of chloride ions, i. e. has absorbed its capacity of sulfate and bicarbonate ions, the flow of water thereto is discontinued and the resin is washed with a concentrated aqueous solution of sodium chloride, e. g. a solution of 15 weight per cent concentration, to displace the absorbed sulfate and bicarbonate ions and regenerate the anion exchange resin. It is then in condition for reemployment in the process.

The process may advantageously be carried out employing two or more beds of the anion exchange resin in such manner that one of the beds of resin may be regenerated while the other is being used in the process.

The following examples illustrate practice of the invention, but are not to be construed as limiting the scope thereof.

*Example 1*

A granular anion exchange resin containing quaternary ammonium groups was placed in a glass tube to form a resin bed having a cross-sectional area of 0.0052 square feet and a depth of 63 inches. The anion exchange resin consisted of the reaction product of trimethylamine with a chloromethylated benzene-insoluble copolymer of 85 parts by weight styrene, 9 parts ethylvinylbenzene and 6 parts divinylbenzene. The resin had an anion exchange capacity equivalent to 17,400 grains of calcium carbonate per cubic foot of resin bed. A saturated aqueous sodium chloride solution was passed downflow through the bed of resin until the concentration of sodium chloride in the solution flowing from the resin was substantially the same as that of the solution entering the bed. This was followed by sufficient distilled water to rinse the resin free of sodium chloride solution. A city water having a pH value of 8.9 and containing 53 parts of sulfate ions ($SO_4^=$), a total of 48 parts of carbonate ($CO_3^=$) and bicarbonate ($HCO_3^-$) ions, and 2.7 parts of silica as $SiO_2$, respectively, per million parts of water, was passed downflow through the resin bed at a rate equivalent to 5 gallons of water per square foot of cross sectional area of the resin bed per minute, i. e. at a rate of about 100 cc. of water per minute. After approximately 50 to 60 gallons of water had passed through the resin bed, the water flowing from the resin was analyzed and found to be free of sulfate and carbonate ions.

*Example 2*

The resin bed of Example 1 was regenerated by washing with an aqueous sodium chloride solution and rinsed with distilled water. A solution, prepared by adding sodium bisulfide (NaHS) to distilled water in amount corresponding to 1.5 parts of hydrogen sulfide ($H_2S$) per million parts of water, was passed downflow through the resin bed at a rate of approximately 100 cc. per minute until about 2 gallons of the solution had been feed into the resin bed. The effluent water from the resin was free of sulfide ions.

The process described herein may advantageously be employed in connection with a cation exchange agent to remove both alkaline earth metal ions and sulfate and bicarbonate ions from water. In this instance, the water may be passed successively through separate beds of an alkali metal salt of a cation exchange agent and a chloride of a strongly basic anion exchange resin, or a stream of the water may be passed through a single bed of resin consisting of a mixture of a strongly basic anion exchange resin containing quaternary ammonium chloride groups and an alkali metal salt of a cation exchange agent, to absorb alkaline earth metal compounds such as calcium bicarbonate, calcium sulfate, magnesium bicarbonate, and magnesium sulfate in a single step.

The cation exchange resins employed in the mixed anion and cation exchange resin bed should be stable to deterioration. Examples of such cation exchange resins are sulfonated phenol-formaldehyde resins containing sulfonic acid radicals attached to the aromatic nucleus or to an aliphatic portion of the molecule, sulfonated tannin-formaldehyde resins and sulfonated copolymers of divinyl-benzene and styrene. The sulfonated phenol-formaldehyde resins such as Amberlite IR-1 and Dowex-30 and the sulfonated copolymers of styrene and divinylbenzene are particularly suited for such use.

In preparing the bed or beds of mixed anion and cation exchange resins the anion exchange resin and the cation exchange resin may be placed in the bed in any desired sequence or combination, i. e. the resins may be combined in alternate layers of anion and cation exchange resin, or intimately mixed with each other or a bed consisting of a single layer of the anion exchange resin and a single layer of the cation exchange resin may be used. It is desirable in most instances, that the anion exchange resin and the cation exchange resin be employed in proportions such that the bed of mixed resins has substantially equal capacity for absorbing anions and cations so as to obtain most efficient use of the resins, although other proportions of the resins may be used.

When the anion exchange and cation exchange resins have absorbed their capacity of ions, the resins may be regenerated by washing the same with an aqueous solution of sodium chloride, e. g. a 15 weight per cent solution, to effect displacement of the alkaline earth metal ions from the cation exchange resin and sulfate and bicarbonate ions from the anion exchange resin. Thus, a single solution may be employed to regenerate both the anion exchange resin and the cation exchange resin in a form suitable for reemployment in the process.

Other modes of applying the principle of the invention may be employed instead of those explained, change being made as regards the methods herein disclosed, provided the step or steps stated by any of the following claims or the equivalent of such stated step or steps be employed.

I claim:

1. A process, for removing sulfate and bicarbonate ions from neutral and alkaline water containing the same, which comprises passing the water through a bed of a chloride of a water-insoluble strongly basic anion exchange resin consisting of a vinyl-aromatic resin having a basic nitrogen atom of a quaternary ammonium group attached to methyl radicals on aromatic nuclei of the resin.

2. A process, for removing sulfate and bicarbonate ions from neutral and alkaline water containing the same, which comprises passing the water through a bed of a chloride of a water-insoluble strongly basic anion exchange resin consisting of the reaction product of a halomethylated vinyl-aromatic resin with a tertiary alkyl amine.

3. A process, for removing sulfate and bicarbonate ions from neutral and alkaline water, which comprises passing the water into contact with a chloride of a water-insoluble strongly basic anion exchange resin consisting of the reaction product of a chloromethylated vinyl-aromatic resin with a tertiary dialkyl N-substituted alkanolamine.

4. A process, for removing sulfate and bicarbonate ions from neutral and alkaline water, which comprises passing the water into contact with a chloride of a water-insoluble strongly basic anion exchange resin consisting of the reaction product of a chloromethylated vinyl-aromatic resin with a tertiary monoalkyl N-substituted alkanolamine.

5. A process, for removing sulfate and bicarbonate ions from neutral and alkaline water, which comprises passing the water into contact with a chloride of a water-insoluble strongly basic anion exchange resin consisting of the reaction product of a chloromethylated polymeric vinyl-aromatic resin with trimethylamine.

6. A process, for removing sulfate and bicarbonate ions from neutral and alkaline water, which comprises passing the water into contact with a chloride of a water-insoluble strongly basic anion exchange resin consisting of the reaction product of a chloromethylated polymeric vinyl-aromatic resin with dimethylethanolamine.

WILLIAM C. BAUMAN.

REFERENCES CITED

The following references are of record in the file of this patent:

UNITED STATES PATENTS

| Number | Name | Date |
|---|---|---|
| 2,259,169 | Little | Oct. 14, 1941 |
| 2,304,637 | Hardy | Dec. 8, 1942 |
| 2,341,907 | Cheetham et al. | Feb. 15, 1944 |